(12) United States Patent
Liang et al.

(10) Patent No.: US 8,419,495 B2
(45) Date of Patent: Apr. 16, 2013

(54) SWITCHABLE PARTICLE-BASED DISPLAY AND METHOD OF MANUFACTURING SAME

(75) Inventors: Rong-Chang Liang, Cupterino, CA (US); Jiunn-Jye Hwang, New Taipei (TW); Jung-Yang Juang, Taipei (TW); Min-Chiao Tsai, Tainan (TW)

(73) Assignee: Delta Electronics Inc., Taoyuan Hsien (TW)

( * ) Notice: Subject to any disclaimer, the term of this patent is extended or adjusted under 35 U.S.C. 154(b) by 147 days.

(21) Appl. No.: 13/167,927

(22) Filed: Jun. 24, 2011

(65) Prior Publication Data
US 2012/0329355 A1 Dec. 27, 2012

(51) Int. Cl.
*H01J 9/00* (2006.01)
*H01J 9/24* (2006.01)

(52) U.S. Cl.
USPC ............ 445/24; 445/25; 445/1; 445/23

(58) Field of Classification Search .................. None
See application file for complete search history.

(56) References Cited

U.S. PATENT DOCUMENTS

| | | | |
|---|---|---|---|
| 3,544,550 A | 12/1970 | Anderton et al. | |
| 3,770,719 A | 11/1973 | Fisher et al. | |
| 3,816,391 A | 6/1974 | Coates et al. | |
| 4,046,752 A | 9/1977 | Hohmann et al. | |
| 4,207,233 A | 6/1980 | Seybold et al. | |
| 4,224,220 A | 9/1980 | Lamm | |
| 6,876,143 B2* | 4/2005 | Daniels | 313/504 |
| 6,919,003 B2* | 7/2005 | Ikeda et al. | 204/490 |
| 7,787,169 B2* | 8/2010 | Abramson et al. | 359/267 |
| 2012/0069064 A1* | 3/2012 | Yamakita | 345/690 |
| 2012/0329356 A1* | 12/2012 | Liang et al. | 445/25 |

OTHER PUBLICATIONS

Chih-Feng Wang et al., Fabrication of Biomimetic Super-Amphiphobic Surfaces Through Plasma Modification of Benzoxazine Films, Macromol. Rapid Commun., 2006, p. 333-337, vol. 27.

Chih-Feng Wang et al., Low-Surface-Free-Energy Materials Based on Polybenzoxazines, Angew. Chem. Int. Ed., 2006, p. 2248-2251, vol. 45.

Akira Nakajima et al., Transparent Superhydrophobic Thin Films with Self-Cleaning Properties, Langmuir, 2006, p. 7044-7047, vol. 16.

Marianne K. Bernett et al., Wetting Properties of Tetrafluoroethylene and Hexafluoropropylene Copolymers, J. Phys. Chem., 1960, p. 1292-1294, vol. 64.

(Continued)

*Primary Examiner* — Natalie Walford
(74) *Attorney, Agent, or Firm* — Morris Manning & Martin LLP; Tim Tingkang Xia, Esq.

(57) ABSTRACT

A method for manufacturing a switchable PBD includes filling a plurality of first-type particles and a plurality of second-type particles into each cell, where the plurality of first-type particles carries charges of a first charge polarity having a first charge density and the plurality of second-type particles is substantially electrically neutral, or carries charges having a second charge density that is substantially lower than the first charge density of the first-type particles, and filling a fluid into each cell, where the fluid comprises a charge controlling agent having a second charge polarity opposite to the first charge polarity, and the charge controlling agent has a substantially selective wettability, absorbability or adsorbability on the plurality of second-type particles. As such, at least part of the plurality of second-type particles is charged to have the second charge polarity in each cell.

14 Claims, 1 Drawing Sheet

OTHER PUBLICATIONS

Alexander Otten et al., How Plants Keep Dry: A Physicist's Point of View, Langmuir, 2004, p. 2405-2408, vol. 20.

Dettre RH et al., Surface Tensions of Perfluoroalkanes and Polytetrafluoroethylene, Journal of Colloid and Interface Science, Dec. 1969, p. 568-569, vol. 31, No. 4.

Doug Anton, Surface-Fluorinated Coatings, Advanced Materials, 1998, p. 1197-1205, vol. 10, No. 15.

N.N. Ghosh et al., Polybenzoxazines—New high performance thermosetting resins: Synthesis and properties, Prog. Polym. Sci., 2007, p. 1344-1391, vol. 32.

C.P. Reghunadhan Nair et al., Advances in addition-cure phenolic resins, Prog. Polym. Sci., 2004, p. 401-498, vol. 29.

Ralf Blossey, Self-cleaning surfaces-virtual realities, Nature Materials, May 2003, p. 301-306, vol. 2.

Chun-Syong Liao et al., Modification of Polymer Substrates with Low Surface Free Energy Material by Low-Temperature Cured Polybenzoxazine, Macromol. Rapid Commun., 2008, p. 52-56, vol. 29.

Qiongdan Xie et al., Facile Creation of a Super-Amphiphobic Coating Surface with Bionic Microstructure, Advanced Materials, Feb. 17, 2004, p. 302-305, vol. 16, No. 4.

Aurélie Lafuma et al., Superhydrophobic states, Nature Materials, Jul. 2003, p. 457-460, vol. 2.

Solomons T. W. G., 18.3 Preparation of Carboxylic Acids, Organic Chemistry 6th ad., 1997, p. 803-810.

Merrington J, James M, Bradley M, Chem Commun 2002, 2, 140.

Caldarelli M, Baxendale IR, Ley SV, Green Chem, 2000, 2, 43.

Winnik FM, Ober CK, Eur Polym J 1987, 8,617.

Horak D, Svec F, Frechet JMJ, J Polym Sci Part A:Polym Chem 1995, 33, 2961.

Tronc F, Li M, Lu JP, Winnik MA, Kaul BL, Graciet, JC, J Polym Sci Part A:Polym Chem 2003, 41, 766.

Shnurpfeil G, Stark J, Wohrle D, Dyes and pigments 1995, 27, 339.

Jing-She Song et al., Monodisperse, controlled micron-size dye-labeled polystyrene particles by two-stage dispersion polymerization, Polymer, 2006, p. 817-825, vol. 47.

* cited by examiner

FIG. 1

SWITCHABLE PARTICLE-BASED DISPLAY AND METHOD OF MANUFACTURING SAME

FIELD OF THE INVENTION

The present invention relates to a display, and more particularly, to a particle-based display and method of manufacturing same.

BACKGROUND OF THE INVENTION

Particle-based display (PBD) technology has drawn a great deal of attention in display industries in recent years. Due to its wide viewing angles, low power consumptions, light weight, and thin thickness, PBDs have found widespread applications in a variety of fields, for example, in electronic readers, electronic papers, electronic tags, electronic signages, and the like. PBDs are capable of providing visual effects similar to that of paper reading. Different from backlight-type flat panel displays, PBDs utilize reflected ambient light from pigment particles to display content, and thus, there is no glare or other effects resulted from strong external light which affect reading. In addition, PBDs consume power only when the displayed contents are subjected to change.

A PBD includes a plurality of independently addressable display cells spatially arranged in the form of a matrix and disposed between a pair of opposed, spaced-apart substrates, and electrodes disposed on at least one substrate, where each display cell is filled with charged pigment particles in two or more colors. When, by applying voltages onto the electrodes, an electric filed is generated between the pair of substrates, the charged pigment particles in the cells migrate by attraction to the respective electrodes having opposite polarities. Thus, the locations of the pigment particles can be controlled by changing the polarities of the electrodes, thereby displaying images of the reflected light from the pigment particles or fluid.

Based on media that suspend/disperse the pigment particles in the cells, PBDs can be grouped into electrophoretic displays or dry powder type displays.

The electrophoretic displays include microcup electrophoretic displays and microcapsule electrophoretic display. In a microcup electrophoretic display, charged pigment particles (usually in white color) are dispersed in a colored fluid, which in turn, is filled in microcup display cells. The microcup display cells are then sealed between the pair of electrodes. The migrations of the pigment particles in the fluid are controlled by changing the voltage difference between the pair of electrodes, so as to achieve image displaying. For the microcup electrophoretic display, in addition to a slow response time of image displaying due to the slow migration of the pigment particles in the fluid, it is difficult to achieve the uniform dispersion of the pigment particles in the fluid. Even if the amount of the fluid filled in each cell is precisely controlled, there are still differences in the numbers of the pigment particles in each cell, which reduces the uniformity of the particle filling. Therefore, for the microcup electrophoretic display, the particles filling process is complicated and difficult to control, thereby increasing manufacturing costs. Also, the uniformity of the particle dispersion is yet to be further improved.

In a microcapsule electrophoretic display, two types of charged pigment particles of white and black colors with opposed polarities are filled and packaged in microcapsule display cells containing a solvent, which are sandwiched between a pair of electrodes. By changing the voltage difference between the pair of electrodes, the pigment particles can be suspended or fell in the microcapsule cells so as to achieve image displaying. Similarly, the microcapsule electrophoretic display has a slow response time of image displaying due to slow motions of the pigment particles in the solvent. Further, particle aggregation exists, thereby causing the instability of the dispersion of the pigment particles in the solvent, which in turn, affects the yield rate of production.

As for a dry powder type display, each display cell is filled with two colored particles (e.g., black and white) having charges with opposite polarities, respectively. The floating state and the falling state of the different colored particles in the cells are controlled by varying external electric fields imposed on the pigment particles, thereby achieving image displaying. In order to overcome the drawbacks of the slow responses of the electrophoretic displays, the pigment particles in the dry powder type displays are selected to have better flowability and floodability. As such, the pigment particles have the characteristic of fluid, and thus move fast when driven by an electric field. However, during the filling process, the pigment particles may be dispersed or spread all over the cells, i.e., the falling of the pigment particles is not along straight line even under the effect of the gravity. In addition, the black and white colored particles having charges with opposite polarities may easily aggregate together because of the electrostatic attraction, which makes the filling of the pigment particles difficult and affects the yield of production. Lowering the charge density of the pigment particles may reduce the electrostatic attraction generated particle aggregation, however, it will reduce the sensitivity of the pigment particles to a driving electric field, which will result in slow responses. Otherwise, the pigment particles need being driven with high voltages. Indeed, it presents a great challenge in the particle filling process to uniformly fill the black and white colored particles having charges of opposite polarities in each display cell. It would gain a great deal of industrial relevance if simplified processes for filling of the pigment particles uniformly and packaging of the particle-filled cells in the PBDs would be available.

Therefore, a heretofore unaddressed need exists in the art to address the aforementioned deficiencies and inadequacies.

SUMMARY OF THE INVENTION

In order to overcome the above mentioned limitations and disadvantages of the existing methods for manufacturing PBDs, one of the objectives of this invention is to provide a PBD manufacturing method that enables forming pigment particles of opposite charge polarities with high densities of charges and filling same uniformly into the display cells, without particle aggregation therein. According to the present invention, the processes of forming pigment particles, filling the same into the cells, and sealing the cells are greatly simplified, which are adapted for both the electrophoretic display and the dry powder type display.

In one embodiment, the method includes mixing two types of particles of two contrast colors to form a particle mixture and filling the particle mixture into the cells. The two contrast colors includes black/white (K/W), red/white (R/W), blue/white (B/W), green/white (G/W), cyan/white (C/W), yellow/white (Y/W), magenta/white (M/W), and so on. The first-type particles include non-wettable particles having chemical inertness and carrying charges with a high charge density, while the second-type particles include wettable particles having reaction selectivity on the surface functionality and carrying no charge or charges with a charge density that is significantly lower than that of the first-type particles. If carried, the charges of the second-type particles have a polarity that is same as or opposite to that of the charges of the first-type particles.

After the particle mixture is filled, a charge controlling agent or a solution containing such a charge controlling agent is filled into the cells. The charge controlling agent has a charge polarity opposite to that of the first-type particles. Under certain conditions, the charge controlling agent chemically reacts with or physically adsorbs to the second-type particles. Consequently, the second-type particles are charged with a high charge density and a charge polarity same as that of the charge controlling agent but opposite to that of the first-type particles. The cells are then sealed between two electrodes. As such, when different voltages are applied onto the two electrodes, an electric filed is generated therebetween, and the charged first-type and second-type particles will move accordingly, thereby achieving image displaying.

In one embodiment, the cell sealing process is performed after the solution in the cells is evaporated. In this case, a dry powder type PBD is obtained.

In one aspect, the present invention relates to a method for manufacturing a switchable PBD having a plurality of cells spatially arranged in a matrix form. Each cell comprises compartment, microcup, microgrid, or partition structure.

In one embodiment, the method includes filling a plurality of first-type particles and a plurality of second-type particles into each cell, where the plurality of first-type particles carries charges of a first charge polarity having a first charge density and the plurality of second-type particles is substantially electrically neutral, or carries charges having a second charge density that is substantially lower than the first charge density of the first-type particles.

In one embodiment, the plurality of first-type particles comprises non-wettable particles having surfaces that are chemical inert, and the plurality of second-type particles comprises wettable particles having reaction selectivity on the surfaces functionality. The surfaces of second-type particles comprise a functional group having the reaction selectivity. The surfaces of the plurality of first-type particles are coated with a low surface energy resin. In one embodiment, the first-type particles and the second-type particles are of contrast colors.

In one embodiment, the step of filling the plurality of first-type particles and the plurality of second-type particles into each cell comprises mixing the plurality of first-type particles and the plurality of second-type particles to form a particle mixture, and filling the particle mixture into each cell. In another embodiment, the step of filling the plurality of first-type particles and the plurality of second-type particles into each cell comprises filling one of the plurality of first-type particles and the plurality of second-type particles in each cell, and filling the other of the plurality of first-type particles and the plurality of second-type particles in each cell.

The method further includes filling a solution into each cell, where the solution comprises a charge controlling agent having a second charge polarity opposite to the first charge polarity, and the charge controlling agent is adapted such that when the plurality of second-type particles is substantially in contact with the charge controlling agent, physical adsorption or chemical reaction occurs so that the plurality of second-type particles is charged to have the second charge polarity and a charge density that is substantially higher than the second charge density in each cell. Preferably, the charge density is substantially same as the first charge density.

In one embodiment, the solution further comprises a solvent having a substantially selective wettability on the plurality of second-type particles. In one embodiment, the charge controlling agent has a substantially selective adsorbability or absorbability on the plurality of second-type particles. In one embodiment, the charge controlling agent comprises ionic molecules or ionic monomers.

In one embodiment, the filling the solution into each cell is performed with printing, coating, casting, deposition, impregnation, spraying, or a combination of them.

In addition, the method also includes removing the solution remaining in each cell.

Moreover, the method includes sealing each cell subsequent to filling the solution.

In another aspect, the present invention relates to a method for manufacturing a switchable PBD having a plurality of cells spatially arranged in a matrix form. Each cell comprises compartment, microcup, microgrid, or partition structure. In one embodiment, the method includes filling a plurality of first-type particles and a plurality of second-type particles into each cell, where the plurality of first-type particles carries charges having a first charge density; and filling a solution into each cell, where the solution comprises a charge controlling agent having a second charge polarity opposite to the first charge polarity, and the charge controlling agent has a substantially selective wettability, absorbability or adsorbability on the plurality of second-type particles, so that at least part of the plurality of second-type particles is charged to have the second charge polarity in each cell.

In one embodiment, the plurality of first-type particles and the plurality of second-type particles are premixed and filled into each cell. In another embodiment, the plurality of first-type particles and the plurality of second-type particles are filled sequentially into each cell.

In one embodiment, prior to mixing, the plurality of second-type particles is substantially electrically neutral. In one embodiment, the plurality of second-type particles carries charges of the first charge polarity and has a charge density that is substantially lower than that of the plurality of first-type particles. In another embodiment, the plurality of second-type particles carries charges of the second charge polarity and has a charge density that is substantially lower than that of the plurality of first-type particles. In yet another embodiment, subsequent to filling, the plurality of second-type particles has a charge density that is substantially same as that of the plurality of first-type particles.

In one embodiment, the first-type particles and the second-type particles are of contrast colors.

In one embodiment, the charge controlling agent comprises ionic molecules or ionic monomers.

In one embodiment, the filling the solution into each cell is performed with printing, coating, casting, deposition, impregnation, spraying, or a combination of them.

In one embodiment, the method also includes removing the solution remaining in each cell.

In one embodiment, the method further includes sealing each cell subsequent to filling the solution.

In yet another aspect, the present invention relates to a switchable PBD having a plurality of cells spatially arranged in a matrix form. Each cell comprises compartment, microcup, microgrid, or partition structure. In one embodiment the PBD has a plurality of first-type particles and a plurality of second-type particles uniformly filled into each cell, where the plurality of first-type particles carries charges of a first charge polarity having a first charge density, and a solution filled into each cell, where the solution comprises a charge controlling agent having a second charge polarity opposite to the first charge polarity, and the charge controlling agent has a substantially selective wettability, absorbability or adsorbability on the plurality of second-type particles such that when the charge controlling agent interacts with the plurality of second-type particles, at least part of the plurality of second-type particles is charged to the second charge polarity in each cell.

In one embodiment, the plurality of first-type particles comprises non-wettable particles having surfaces that are chemical inert, and the plurality of second-type particles comprises wettable particles having surfaces that have reaction selectivity. In one embodiment, the surfaces of second-type particles comprise a functional group capable of interacting with the charge controlling agent through physical adsorption or chemical reaction. The surfaces of the plurality of first-type particles are coated with a low surface energy resin. In one embodiment, prior to interaction with the charge controlling agent in each cell, the plurality of second-type particles is substantially electrically neutral, or carries charges having a second charge density that is substantially lower than the first charge density of the first-type particles. In one embodiment, the first-type particles and the second-type particles are of contrast colors.

In one embodiment, the solution further comprises a solvent having a substantially selective wettability on the plurality of second-type particles.

In one embodiment, the charge controlling agent comprises ionic molecules or ionic monomers.

According to the present invention, the PBD manufacturing method may have at least one of the following advantages:

(1) Only are two processes needed to complete the formation and fill of pigment particles of two contrast colors having charges of high densities with opposite polarities, thereby reducing manufacturing time and costs.

(2) Adapted for both the electrophoretic displays and the dry powder type displays.

(3) Some of pigment particles are configured to have chemical inert surface reaction characteristics, while the other is configured to have reaction selectivity, such that when they are in contact with the charge controlling agent, the pigment particles with the reaction selectivity (usually carrying no charge or charges of low density) react with the charge controlling agent, while the other pigment particles do not react with the charge controlling agent because of the chemical inert surface reaction characteristics. This simplifies the formation process of the charged pigment particles, thereby reducing costs.

(4) Prior to fill the pigment particles of two contrast colors into the cells, only the pigment particles of the first color carry charges of high density. The pigment particles of the second color are charged to have charges of high density with a polarity opposite to that of the pigment particles of the first color, by reacting with the charge controlling agent inside the cells. Therefore, in the particle filling process, no particle aggregation occurs, which enables the pigment particles to be filled uniformly in the cells.

(5) Pigment particles are configured to special reaction selectivity for selectively reacting with other functional molecules so as to change its color, such as red, green, blue, cyan, magenta, yellow, and/or charge polarity, which is applicable in black and white PBDs and other color PBDs.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment, and wherein.

DETAILED DESCRIPTION OF THE INVENTION

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom", "upper" or "top," and "front" or "back" may be used herein to describe one element's relationship to another element as illustrated in the FIGURES. It will be understood that relative terms are intended to encompass different orientations of the device in addition to the orientation depicted in the FIGURES. For example, if the device in one of the FIGURES is turned over, elements described as being on the "lower" side of other elements would then be oriented on "upper" sides of the other elements. The exemplary term "lower", can therefore, encompasses both an orientation of "lower" and "upper," depending of the particular orientation of the FIGURE. Similarly, if the device in one of the FIGURES is turned over, elements described as "below" or "beneath" other elements would then be oriented "above" the other elements.

The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "plurality" means a number greater than one.

As used herein, the terms "display cell" and "cell" are synonyms and refer to a smallest addressable screen unit of a display.

OVERVIEW OF THE INVENTION

The description will be made as to the embodiments of the present invention in conjunction with the accompanying drawings in FIG. 1. In accordance with the purposes of this invention, as embodied and broadly described herein, this invention, in one aspect, relates to a PBD and method of manufacturing the same.

In the manufacture of PBDs, whether it is an electrophoretic PBD, or dry powder type PBD, a key factor affecting image displaying of the display is whether the pigment particles are filled in the display cells uniformly. The non-uniformity of the pigment particles filled in the display cells results in poor chromaticity in the display.

However, the existing technologies, as discussed above, have the shortcomings in filling the pigment particles in the display cells. For a PBD, the image displaying is implemented by changing the electric fields so as to address the motions of the pigment particles in the display cells, and thus the pigment particles are charged particles. In a dry powder type PBD, the cells are filled with the pigment particles of two contrast colors having charges of polarities opposite to one another. If the two types of the pigment particles are filled simultaneously, the particle aggregation will occur during the filing process because of the attraction between the pigment particles of opposite polarities, which makes filling the pigment particles uniformly in the display cells very difficult. If they are filled sequentially, the particle uniformity in the cells may be obtained, by utilizing the known electrostatic powder coating. However, when sequentially filling the pigment particles of the opposite charge polarity, an electric field needs being applied under the display cells, which may cause the filled pigment particles therein to scatter or splashed from the cells. The process cannot make the pigment particles uniformly filled in the cells either.

It is therefore the object of the present invention to provide a PBD manufacturing method to overcome the shortcomings. According to the invention, the first pigment particles are charged to carry charges of high density have a polarity, while the second pigment particles carry no charge or charges of low density. The two types of the pigment particles can be filled in the display cells simultaneously and sequentially. By interacting with a charge controlling agent (e.g., through chemical reaction or physical adsorption), the filled pigment particles of the second color are then charged inside the cells to carry charges of high density with a polarity opposite to that of the pigment particles of the first color. As such, the two types of pigment particles having high charge density with opposite polarities are filled uniformly in the cells.

According to the invention, the pigment particles are configured to have desired surface characteristics. For example, the pigment particles of the first color carrying the high density charges are non-wettable particles and have chemically inert surface reaction characteristics, which make the carried high density charges more stable and reduce the loss of the same during the other processes. For the pigment particles of the second color carrying no charge or the low density charges, their surfaces are wettable and have functional groups with special reaction selectivity. They are then charged to have a high charge density, or colored in, e.g., black, white, red, green, blue, cyan, magenta, yellow, or other color, by chemical reaction or physical adsorption.

Lowering surface energy results in enhancement of the non-wettability and chemical inertness of a material surface. Generally, the surface of a material is categorized in hydrophilic or hydrophobic. If the surface is hydrophilic, the material has a tendency to interact with water and other polar substances, while to be repelled from oil. That is the affinity of the material to an oil-based solvent is relatively poor. The hydrophilic material thus has a better oil-based solvent repellency. On the other hand, if the surface is hydrophobic, the material tends to be non-polar and thus prefer other neutral molecules and non-polar solvents and has a tendency to be repelled from water. Accordingly, the hydrophobic material has high resistance to a polar substance. Such a material can have both hydrophobic and oleophobic properties, and thus no chemical reaction and physical adsorption can easily occur on its surface, which makes it the excellent chemical inert material.

Currently, the most well-known low surface energy material is polytetrafluoroethylene (PTFE), where its surface energy is about 22 $mJ/m^2$. Applications of PTFE include, for example, water-repellent surface coating and stain/corrosion prevention. In addition, PTFE is not easy to be processed and has a low oil-repellency, which limits its applications. In order to overcome the shortcomings of PTFE, other low surface energy materials have recently been developed, which include fluorinated resin and polysiloxane polymer. The mechanisms of lowering the surface energies of these materials are different. For the fluorinated resin, it uses the C—F bonds to effectively reduce the surface energy by introducing a large number of fluorine atoms in the structure. In addition, the surface energy of the fluorinated resin can also be lowered by modifying its physical structure, such as: increasing its surface roughness, reducing its surface crystallinity, and including a comb-like structure. Besides PTFE, the fluorinated resin also includes poly(perfluoroalkylacrylate) (PFA) series of fluorinated acrylic resin, which its surface energy lowers as increasing the rate of fluorine atoms in the structure. Having its main chain structure soft and its fluorine groups in the side chains, the surface energy can be reduced to about 5 $mJ/m^2$, which makes the PFA series excellent hydrophobic and oleophobic materials. For the polysiloxane polymer, it mainly utilizes increasing the surface roughness of the microstructure to lower the surface energy, so as to have both hydrophobic and oleophobic properties. Poly(dimethylsiloxane) is one of such a material. Moreover, non-fluorinated and non-silicon, low surface energy materials, such as Polybenzoxazine, (PBZ), are also available. The surface energy of PBZ can be reduced by thermal treatments and changing the state of the crystalline surface and the force of intermolecular hydrogen bonds.

Therefore, pigment particles with its surfaces having both hydrophobic and oleophobic properties and the chemical inertness can be obtained by combining the surfaces of the pigment particles with a low surface energy material through surface processing technologies, without changing its charge density and polarity and capability of color display. As to change the charge density and polarity of pigment particles, the surface structure of such pigment particles needs to be wettable and has a special functional group with a rapid response and reaction selectivity. By interacting with a charge controlling agent, the pigment particles can be charged to carry high density charges without changing its capability of color display. Among many functional groups, acid chloride is one of highly reactive functional groups, can be obtained via the preparation of carboxylic acid with thionyl chloride or phosphorus trichloride. Such a functional group is known to have the high reactivity of functional groups, which, with the amine, can form a stable amide, and with hydroxyl, can form ester. These bonds are produce with no need of special reaction conditions and catalysts. In addition to the above functional groups having better reactivity, there are some functional groups of which the reactivity is presented in certain specific reactive groups, such as a hydroxyl group. The reactivity of the hydroxyl functional groups is relatively lower than that of amino and carboxylic acid, but the hydroxyl functional group is highly reactive with the alkoxysilyl functional group. Therefore, the property can also be applied in the design of the chemical structure of the surface of pigment particles so as to make the pigment particles to have reactivity and selectivity. Furthermore, in addition to change the charge density and polarity of the pigment particles, the color of the pigment particles can also be changed simultaneously by interacting the functional groups with special functional molecules, for example, dye (pigment) precursor or derivatives.

According to the invention, through modifying the surface structures of different pigment particles of two contrast colors, the surfaces of the pigment particles of the first color that carry the high density charges are configured to have the non-wettability and chemical inertness, while the surfaces of the pigment particles of the second color that carry no charge or the low density charges are configured to have the wettability and functional groups with the reaction selectivity and rapid responses. After filling such pigment particles of the two contrast colors into the cells, the pigment particles carrying of the second color are charged to have charges of a high density by interacting with the charge controlling agent through the chemical reaction or physical adsorption in the cells. As such, the particle aggregation can be avoided during the particle filling process, which makes the pigment particles of the two contrast colors filled uniformly in the cells, thereby simplifying effectively the manufacturing processes, increasing the production yield and reducing the costs.

In one embodiment, the two contrast colors (first/second colors) includes black/white (K/W), red/white (R/W), blue/white (B/W), green/white (G/W), cyan/white (C/W), yellow/white (Y/W), magenta/white (M/W), and so on. The pigment particles of the first color comprises non-wettable particles having chemical inert surface reaction characteristics and carrying charges of a high density, while the pigment particles of the second color comprises wettable particles having the functional groups with special reactivity and carrying no charge or charges of a low density. If carried, the charges of the pigment particles of the second color have a polarity that is same as or opposite to that of the charges of the pigment particles of the first color. The pigment particles of the first and second colors are mixed to form a mixture. The mixture is then filled in the cells of a PBD.

After the mixture is filled, a charge controlling agent or a solution having such a charge controlling agent is filled into the cells. Preferably, the solution and/or the charge controlling agent are in a form of liquid or fluid. The charge controlling agent has a charge polarity opposite to that of the pigment particles of the first color. The functional groups of the pigment particles of the second color are capable of interacting with the charge controlling agent through the physical adsorption or chemical reaction to form a chemisorption. After interacted, the pigment particles of the second color are charged with a high charge density and a charge polarity same as that of the charge controlling agent but opposite to that of the pigment particles of the first color. Because of the non-wettability and chemical inertness of the pigment particles of the first color, the charge controlling agent has no effect on the pigment particles of the first color. The cells are packaged between two electrodes. Alternatively, the charge controlling agent is evaporated from the cells after the pigment particles of the second color are charged, and the cells are then packaged between two electrodes. The former makes an electrophoretic PBD, while the latter makes a dry powder type PBD.

Figure 1:
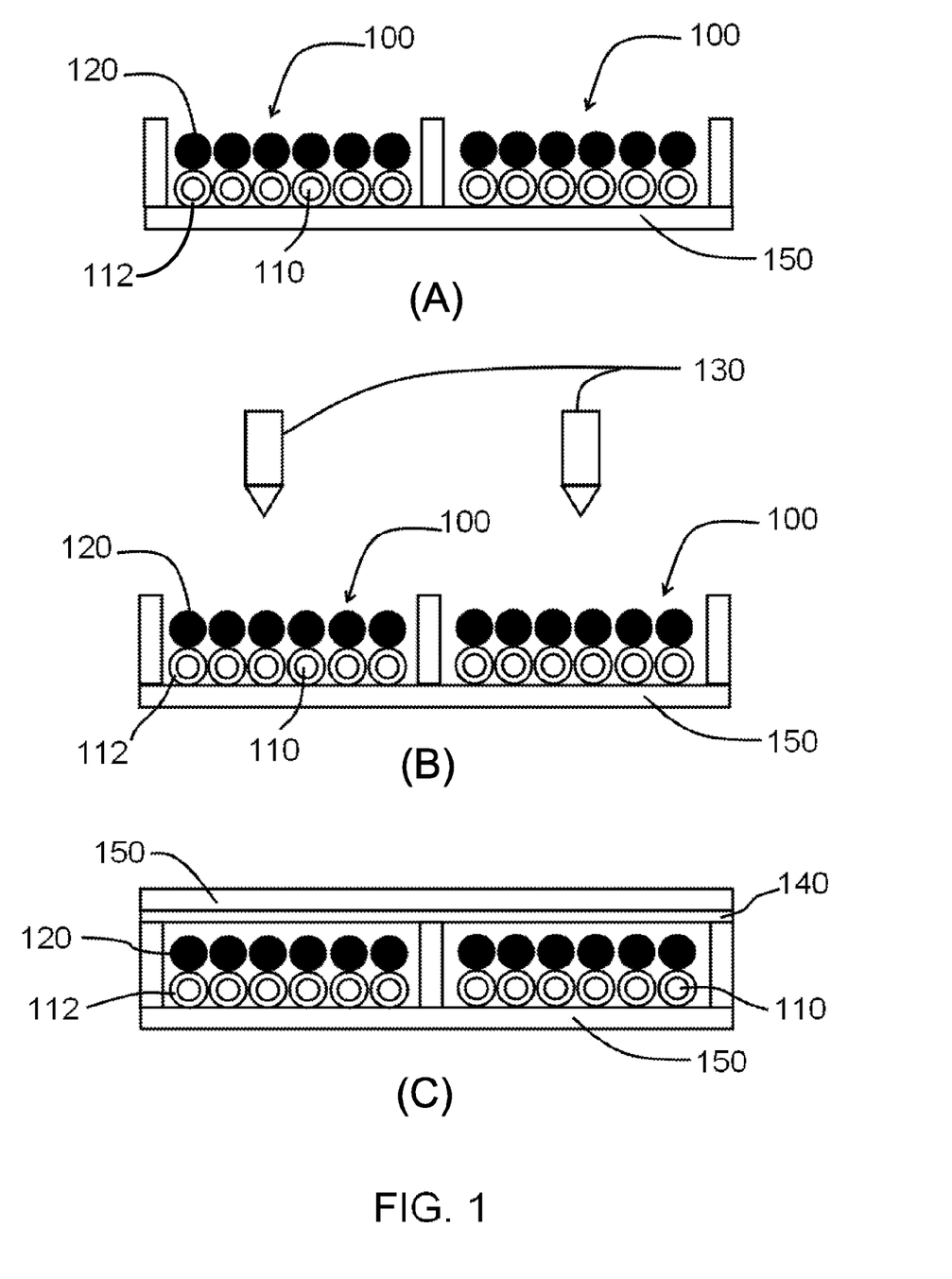
FIG. 1 shows schematically a method of fabricating a switchable PBD according to one embodiment of the present invention.

Referring to FIG. 1, processes of manufacturing a PBD are schematically shown according to embodiments of the present invention. The PBD has a plurality of display cells 100 spatially arranged in a matrix form. For the purpose of illustration of the invention, only two cells 100 are shown in FIG. 1. Each cell 100 is uniformly filled with a plurality of first-type particles 110 and a plurality of second-type particles 120, as shown in FIG. 1(A).

As shown in FIG. 1(A), the first-type particles 110 carry charges of a first charge polarity having a first charge density. The first charge polarity can be positive (+), or negative (−). Further, the surfaces of the first-type particles 110 are coated, for example, with a low surface energy resin layer 112, such that the first-type particles 110 have the properties of the non-wettability particles and the chemical inertness.

Initially, the second-type particles 120 are substantially electrically neutral, or carry charges having a second charge density that is substantially lower than the first charge density of the first-type particles 110, as shown in FIG. 1(A). The second-type particles 120 are wettable particles having surface functionality with reaction selectivity.

The first-type particles 110 and the second-type particles 120 are of contrast colors. The contrast colors are disclosed above. In one embodiment, the first-type particles 110 have a white (or light) color, while the second-type particles 120 have a black (or dark) color.

The first-type particles 110 and the second-type particles 120 are filled in the cells 100. For example, in one embodiment, the first-type particles 110 are filled first, while the second-type particles 120 are filled sequentially. In another embodiment, the second-type particles 120 are filled first, while the first-type particles 110 are filled sequentially. In yet another embodiment, the first-type particles 110 and the second-type particles 120 are premixed to form a particle mixture. Then the particle mixture is filled in the cells 100.

After the first-type particles 110 and the second-type particles 120 are filled in the cells 100, a solution having a charge controlling agent is filled into the cells 100 by a injecting means 130, as shown in FIG. 1(B). The charge controlling agent has a second charge polarity opposite to that of the first-type particles 110. The charge controlling agent is adapted such that when the second-type particles 120 is substantially in contact with the charge controlling agent, physical adsorption or chemical reaction occurs so that the second-type particles 120 are charged to have the second charge polarity and a charge density that is substantially higher than its initial charge density. Because of the non-wettability and chemical inertness of the first-type particles 110, the charge controlling agent has no effect on the first-type particles 110. As such, the charged first-type and second-type particles 110 and 120 of opposite polarities uniformly filled, without particle aggregation.

As shown in FIG. 1(C), the cells 100 are then sealed by sealant 140, and mounted or disposed between two electrodes 150. By varying the electric filed applied between the two electrodes 150, the charged first-type and second-type particles 110 and 120 migrate accordingly, thereby achieving image displaying.

In one embodiment, the remaining solution is evaporated from the cells before sealing the cells so as to dry the pigment particles. The process will produce a dry powder type PBD.

The first-type particles, the second-type particles, the solution, the charge controlling agent, and others are described as below in further details.

In one embodiment, the first-type particles of the first color comprises non-wettable particles having chemical inert surface reaction characteristics and carrying charges of a high density, while the second-type particles of the second color comprises wettable particles having the functional groups with special reactivity and carrying no charge or charges of a low density. In one embodiment, the process of forming the pigment particles is performed with a pulverization method or a chemical synthesis method. The pulverization method includes, but not limited to, a ball mill, a bead mill, and a jet mill. The chemical synthesis method includes, but not limited to, an emulsion polymerization, suspension polymerization dispersion polymerization. The pigment particles are colored with a colorant having a ratio of about 1-50%, preferably, about 3-40%.

In one embodiment, the black colorant includes carbon black, copper oxide, manganese dioxide, aniline black, active carbon, sudan black, derivatives of them, or other compounds in black. The white colorant includes titanium dioxide, zinc oxide, derivatives of them, or other compounds in white. The red colorant includes red oxide, permanent red 4R, lithol red, pyrazolone red, lake red D, permanent red F5RK, allura red, brilliant red, derivatives of them, or other compounds in red. The green colorant includes chrome green, pigment green B, Malachite green lake, fast green G, derivatives of them, or and other compounds in green. The blue stain includes phthalocyanine blue, metal free phthalocyanine blue, partial chlorinated phthalocyanine blue, triarylcarbonium, Berlin blue, cobalt blue, alkali blue lake, Victoria blue lake, first sky blue, Indunsren blue, derivatives of them, or other compounds in blue. The yellow colorant includes chrome yellow, yellow iron oxide, naphthol yellow, hansa yellow, benzidine yellow G, benzidine yellow GR, quinoline yellow lake, tartrazinelake, derivatives of them, or other compounds in yellow. The orange colorant includes molybdenum orange, permanent orange GTR, pyrazolone orange, benzidine orange G, Indunsren brilliant orange RK, Indunsren brilliant orange GK, Balkan orange, derivatives of them, or other compounds in orange. The purple colorant includes manganese purple, first violet B, fast violet RL, fast violet lake, pigment violet EB, derivatives of them, or other compounds in purple. The listed colorant compositions and their derivatives are examples only and other colorants can also be utilized.

In one embodiment, the first-type particles carrying the high density charges include polymer particles, and formed of a material including styrene resin and its derivatives, polyamide resin and its derivatives, acrylate resin and its derivatives, polyurethane resin and its derivatives, urea resin and its derivatives, polyester resin and its derivatives, epoxy resin and its derivatives, melamine resin and its derivatives, phenol resin and its derivatives, or compounds of these resins and their derivatives. In preferable embodiments, the first-type particles are formed of the styrene resin and/or acrylic resin with a resin ratio of about 98-50%, and preferably about 95-65%. The first-type particles may contain a charge controlling agent and thus carry charges of a high density. In one embodiment, the ratio of the charge controlling agent is about 0-25%, preferably, about 0-10%. The charge controlling agent includes nigrosine, triphenylmethane derivatives, quaternary ammonium salt, metal complex with sulfonate and carboxylic acid and its derivatives, silane and its derivatives, carboxylic acid, carboxylate salt and its derivatives, sulfonic acid, sulfonate salt and its derivatives, amine and its derivatives, thiophene and its derivatives, pyridine and its derivatives, or compounds of them. The listed charge controlling agents are examples only and other charge controlling agents can also be utilized.

In one embodiment, the surfaces of the first-type particles are treated to lower its surface energy so that the particle surfaces have the non-wettability and chemical inertness. The material from which the pigment particles are formed includes fluoroinated resin and its derivatives, fluoroinated acrylate resin and its derivatives, polysioxane resin and its derivatives, polybenzoxazine resin and its derivatives or a combination of them and their derivatives. The non-wettable and chemical inert first-type particles have a particle size of about 0.01-20 μm, preferably, about 0.1-10 μm, and a charge density in range of about ±0-150 μC/g, preferably, ±15-120 μC/g.

In one embodiment, the second-type particles carrying the low density charges include polymer particles, and formed of a material including styrene resin and its derivatives, polyamide resin and its derivatives, acrylate resin and its derivatives, polyurethane resin and its derivatives, urea resin and its derivatives, polyester resin and its derivatives, epoxy resin and its derivatives, melamine resin and its derivatives, phenol resin and its derivatives, or compounds of these resins and their derivatives. In preferable embodiments, the second-type particles are formed of the styrene resin and/or acrylic resin with a resin ratio of about 98-50%, and preferably about 95-65%.

In one embodiment, the surfaces of the second-type particles contain reactive functional groups including acryl chloride, vinyl, phenol, hydroxy, carboxylic acid, carboxylate, amine, amide, aldehyde, ketone, silane, sioxane or the like. The listed functional groups are examples only and other functional groups can also be utilized.

In one embodiment, the wettable and reaction selective second-type particles have a particle size of about 0.01-20 μm, preferably, about 0.1-10 μm, and a charge density in range of about ±0-150 μC/g, preferably, ±0-80 μC/g.

After the first-type and second-type particles are filled in the cells, a charge controlling agent is filled in the cells. In one embodiment, the filling charge controlling agent is performed by printing, coating, casting, deposition, impregnation, or spraying. Under certain conditions, the charge controlling agent interacts with the second-type particles with their surfaces having the wettability and functional groups with the desired reaction selectivity via the physical adsorption or chemical reaction, so as to charge the second-type particles to have a high charge density. The charge density is in range of about ±0-150 μC/g, and preferably, ±10-80 μC/g. As such, the formation and fill of the two contrasting colored pigment particles of the high charge densities with opposite polarities are completed. The cells can be sealed to form an electrophoretic PBD. Alternatively, the solution in the cells is removed or evaporated to obtain dried particles therein. Then, the cells are sealed to form a dry powder type PBD.

In one embodiment, the charge controlling agent includes nigrosine, triphenylmethane derivatives, quaternary ammonium salt, metal complex with sulfonate and carboxylic acid and its derivatives, silane and its derivatives, carboxylic acid, carboxylate salt and its derivatives, sulfonic acid, sulfonate salt and its derivatives, amine and its derivatives, thiophene and its derivatives, pyridine and its derivatives, or compounds of them. In one embodiment, the charge controlling agent is soluble or disperseable in solvents. The organic solvents includes alcohols such as methanol, ethanol or other high molecular weight alcohols, ether such as ether, petroleum ether, tetrahydrofuran or ether derivatives, ketone such as methyl ethyl ketone, or ketone derivatives, fluoroinate solvent, halogen solvent such as chloroform, dichloromethane, aromatic solvent such as toluene, p-xylene, carboxylic acid, such as acetic acid, esters such as ethyl acetate, amide such as dimethylacetamide, dimethyl sulfoxide, alkane such as n-hexane, water or any combination of the above. The listed charge controlling agents and solvents are examples only and other charge controlling agents and solvents can also be utilized.

In one embodiment, the charge controlling agent has a substantially selective wettability, absorbability or adsorbability on the second-type particles. As such, when the charge controlling agent interacts with the second-type particles, at least part of the second-type particles is charged to have the second charge polarity.

These and other aspects of the present invention are further described below.

EXAMPLES OF THE INVENTION

Without intent to limit the scope of the invention, further exemplary processes and their related results according to the embodiments of the present invention are given below. Note again that titles or subtitles may be used in the examples for convenience of a reader, which in no way should limit the scope of the invention.

Example 1

Desired amounts of polyvinyl pyrrolidone (Sigma-Aldrich), azobis(2-methyl-butyronitrile) (TCI), perfluorodecyl acrylate (Alfa-Aesar) and styrene (Acros) are added into an amount of ethanol and completely dissolved therein to form a first liquid mixture, which is then in a high temperature environment for polymerization for a period of time. Then, separating and drying processes are performed to obtain particles. The obtained particles are coated with TiO$_2$ powders (R102, DuPont) and the charge controlling agent (Bontron E84, Orient), by the dry coating process, to obtain first-type particles with a particle size ($D_{50}$) about 3.0 μm.

In addition, desired amounts of polyvinyl pyrrolidone (Sigma-Aldrich), azobis(2-methyl-butyronitrile) (TCI), styrene (Acros), the charge controlling agent (Bontron N07, Orient), and carbon black (Nexon 600, Evonik) are added in an amount of ethanol and mixed homogeneously therein to form a second liquid mixture, which is then in a high temperature environment for polymerization for a period of about 24 hrs. Then, separating and drying processes are performed to obtain black particles with a particle size ($D_{50}$) about 4.0 μm and the charge density about 1 μC/g (210HS-3, Trek). The black particles are corresponding to the second-type particles.

The white and black particles are mixed to form a mixture of particles, which is filled into the display cells. Then a solution formed of the charge controlling agent (Bontron P51, Orient) with ethanol/tetrahydrofuran is filled into the display cells by ink-jet printing. The remaining solution in the cells is removed, for example, by heating. Accordingly, the formation and fill of the charged black and white particles of opposite polarities in the cells are completed.

Example 2

Desired amounts of polyvinyl pyrrolidone (Sigma-Aldrich), azobis(2-methyl-butyronitrile) (TCI), styrene (Acros), the charge controlling agent (Bontron N07, Orient), and carbon black (Nexon 600, Evonik) are added in an amount of ethanol and mixed homogeneously therein to form a liquid mixture, which is then in a high temperature environment for polymerization for a period of time to obtain black particles with a particle diameter ($D_{50}$) about 4.0 μm and a charge density about 1 μC/g (210HS-3, Trek). The black particles are corresponding to the second-type particles.

Further, acrylic resin (CM 205, ChiMei), the charge controlling agent (Bontron E84, Orient) and TiO$_2$ powders (R706, DuPont) are added in a twin screw extruder (MPV 2015, APV) to make composite resin therewith, which is then milled with a milling process (LJ3, NPK) to obtain white particles with a particle size ($D_{50}$) about 3-6 μm and a charge density −27 μC/g (210HS-3, Trek). The white particles are dispersed in water to form a dispersion solution. Then, perfluorodecyl acrylate (Alfa-Aesar) and potassium persulfate (Acros) are added into the dispersion solution to perform surface polymerization on the surfaces of the white particles.

The white and black pigment particles are mixed and then filled into the display cells. The particle-filled display cells are filled with, by ink jet printing, a solution formed of the charge controlling agent (TP415, Hodogaya) and ethanol/dichloromethane, followed by the heating process to remove the remaining solution therein. Accordingly, the formation and fill of the charged black and white particles of opposite polarities in the cells are completed.

Example 3

Polyvinyl pyrrolidone (Sigma-Aldrich), azobis(2-methyl-butyronitrile) (TCI), 2-hydroxyethyl methacrylate (Acros), divinylbenzene (Sigma-Aldrich) and styrene (Acros) are added into ethanol and completely dissolved therein to form a liquid mixture. The liquid mixture is placed in a high temperature environment for polymerization for a period of time. Then, separating and drying processes are performed to obtain particles. The obtained particles are coated with TiO$_2$ powders (R102, DuPont) and the charge controlling agent (Bontron E84, Orient), by the dry coating process, to obtain the white particles with a particle size about 3.0 μm and a charge density −44 μC/g (210HS-3, Trek). The white particles are then dispersed in water to form a first dispersion solution. Next, perfluorodecyl acrylate (Alfa-Aesar) and potassium persulfate (Acros) are added into the first dispersion solution to perform surface polymerization on the surfaces of the white particles, which are corresponding to the first-type particles.

Further, acrylic resin (CM 205, ChiMei), and carbon black (Nexon 600, Evonik) are added in twin screw extruder (MPV 2015, APV) to make composite resin therewith, which is pulverized (LJ3, NPK) to obtain black particles with a particle size ($D_{50}$) about 2-6 μm. The black particles are then dispersed in water to form a second dispersion solution. Next, 2-hydroxyethyl methacrylate and potassium persulfate (Acros) are added into the second dispersion solution to perform surface polymerization on the surfaces of the black particles to obtain the second-type particles.

The white and black pigment particles are mixed and then filled into the display cells. The particle-filled display cells are filled with, by ink jet printing, a solution 3-Aminopropyl-triethoxysilane (Acros) solution, followed by the heating process to remove the remaining solution therein, whereby the formation and fill of the charged black and white particles of opposite polarities in the cells are completed.

Example 4

Styrene resin (PG383, ChiMei), the charge controlling agent (Bontron E84, Orient) and $TiO_2$ powders (R102, DuPont) are added in a twin screw extruder (MPV 2015, APV) to make composite resin therewith, which is then pulverized (LJ3, NPK) to obtain white particles with a particle size ($D_{50}$) about 4-7 μm. The white particles are dispersed in water to form a dispersion solution. Then, perfluorodecyl acrylate (Alfa-Aesar) and potassium persulfate (Acros) are added into the dispersion solution to perform surface polymerization on the surfaces of the white particles. As a result, the first-type particles are obtained.

In addition, acrylate resin (CM 205, ChiMei), poly(vinyl alcohol) (BP-20, CCP) and carbon black (Nexon 600, Evonik) are added in a twin screw extruder (MPV 2015, APV) to make composite resin therewith, which is then pulverized (LJ3, NPK) to obtain black particles with a particle size ($D_{50}$) about 3-7 μm.

The white and black pigment particles are mixed and then filled into the display cells. The particle-filled display cells are filled with an N-Trimethoxysilylpropyl-N,N, N-trimethylammonium chloride (Sigma-Aldrich) solution, followed by the heating process to remove the remaining solution therein, thereby completing the formation and fill of the charged black and white particles of opposite polarities in the cells.

Example 5

Polyvinyl pyrrolidone (Sigma-Aldrich), azobis(2-methyl-butyronitrile) (TCI), vinyl benzonic sulfate sodium salt (Sigma-Aldrich), and styrene (Acros) are added into ethanol and completely dissolved therein to form a liquid mixture. The liquid mixture is placed in a high temperature environment for polymerization for a period of time. Then, separating and drying processes are performed to obtain particles. The obtained particles are coated with $TiO_2$ powders (R102, DuPont) and the charge controlling agent (Bontron E84, Orient), by the dry coating process, to obtain the coated particles having the white surfaces, with a particle size or diameter ($D_{50}$) about 3.0 μm and a charge density −26 μC/g (210HS-3, Trek). The white particles are then dispersed in water to form a dispersion solution. Next, perfluorodecyl acrylate (Alfa-Aesar) and potassium persulfate (Acros) are added into the dispersion solution to perform surface polymerization on the surfaces of the white particles, which are corresponding to the first-type particles.

In addition, acrylate resin (CM 205, ChiMei), the charge controlling agent (Bontron N07, Orient) and carbon black (Nexon 600, Evonik) are added in a twin screw extruder (MPV 2015, APV) to make composite resin therewith, which is then pulverized (113, NPK) to obtain black particles with a particle size ($D_{50}$) about 2-6 μm.

The white and black pigment particles are filled into the display cells. The particle-filled display cells are filled with, by ink-jet printing, a solution formed of the charge controlling agent (Bontron P51, Orient) and ethanol/tetrahydrofuran, followed by the heating process to remove the remaining solution therein, thereby completing the formation and fill of the charged black and white particles of opposite polarities in the cells.

Example 6

Polyvinyl pyrrolidone (Sigma-Aldrich), azobis(2-methyl-butyronitrile) (TCI), 3-Sulfopropyl methacrylate potassium salt (Sigma-Aldrich), divinylbenzene (Sigma-Aldrich) and styrene (Acros) are added into ethanol and completely dissolved therein to form a liquid mixture, which is placed in a high temperature environment for polymerization for a period of time. Then, separating and drying processes are performed to obtain particles. The obtained particles are coated with $TiO_2$ powders (R102, DuPont) and the charge controlling agent (Bontron E84, Orient), by the dry coating process, to obtain the white particles with a particle size ($D_{50}$) about 3.0 μm and a charge density −40 μC/g (210HS-3, Trek). The white particles are then dispersed in water to form a dispersion solution. Next, perfluorodecyl acrylate (Alfa-Aesar) and potassium persulfate (Acros) are added into the dispersion solution to perform surface polymerization on the surfaces of the white particles, which are corresponding to the first-type particles.

In addition, acrylate resin (CM 205, ChiMei), the charge controlling agent (Bontron N07, Orient) and carbon black (Nexon 600, Evonik) are added in a twin screw extruder (MPV 2015, APV) to make composite resin therewith, which is then pulverized (113, NPK) to obtain black particles with a particle size ($D_{50}$) about 3-8 μm and a charge density 15 μC/g (210HS-3, Trek).

The white and black pigment particles are filled into the display cells. The particle-filled display cells are filled with, by ink-jet printing, a solution formed of the charge controlling agent (Bontron P51, Orient) and ethanol/tetrahydrofuran, followed by the heating process to remove the remaining solution therein, thereby completing the formation and fill of the charged black and white particles of opposite polarities in the cells.

Example 7

Polyvinyl pyrrolidone (Sigma-Aldrich), azobis(2-methyl-butyronitrile) (TCI), 2-carboxyethyl methacrylate (Sigma-Aldrich), divinylbenzene (Sigma-Aldrich) and styrene (Acros) are added into ethanol and completely dissolved therein to form a liquid mixture, which is placed in a high temperature environment for polymerization for a period of time. Then, separating and drying processes are performed to obtain particles. The obtained particles are coated with $TiO_2$ powders (R102, DuPont) and the charge controlling agent (Bontron E84, Orient), by the dry coating process, to obtain the white particles with a particle size ($D_{50}$) about 3.0 μm. The white particles are then dispersed in water to form a first dispersion solution. Next, perfluorodecyl acrylate (Alfa-Aesar) and potassium persulfate (Acros) are added into the first dispersion solution to perform surface polymerization on the surfaces of the white particles, which are corresponding to the first-type particles.

Additionally, polyvinyl pyrrolidone (Sigma-Aldrich), azobis (2-methyl-butyronitrile) (TCI), styrene (Acros), the charge controlling agent (Bontron N07, Orient), and carbon black (Nexon 600, Evonik) are added in an amount of ethanol and mixed homogeneously therein to form a liquid mixture, which is then in a high temperature environment for polymerization for a period of about 24 hrs. Then, separating and drying processes are performed to obtain black particles with a particle diameter ($D_{50}$) about 4.0 μm and the charge density about 1 μC/g (210HS-3, Trek). The black particles are then dispersed in water to form a second dispersion solution. Next, glycidyl methacrylate (TCI) and potassium persulfate (Acros) are added into the second dispersion solution to perform surface polymerization on the surfaces of the black particles, which are corresponding to the second-type particles.

The white and black particles are mixed to form a mixture of particles, which is filled into the display cells. Then an N-Trimethoxysilylpropyl-N,N,N-trimethylammonium chloride (Sigma-Aldrich) solution is filled into the display cells by ink-jet printing. The remaining solution in the cells is removed, for example, by heating, whereby the formation and fill of the charged black and white particles of opposite polarities in the cells are completed.

Example 8

Polyvinyl pyrrolidone (Sigma-Aldrich), azobis(2-methyl-butyronitrile) (TCI), 4-vinyl benzonic acid (Sigma-Aldrich) and styrene (Acros) are added into ethanol and completely dissolved therein to form a liquid mixture, which is placed in a high temperature environment for polymerization for a period of time. Then, separating and drying processes are performed to obtain particles. The obtained particles are coated with $TiO_2$ powders (R102, DuPont) and the charge controlling agent (Bontron E84, Orient), by the dry coating process, to obtain the white particles with a particle size ($D_{50}$) about 3.0 μm and a charge density –26 μC/g (210HS-3, Trek). The white particles are then dispersed in water to form a first dispersion solution. Next, perfluorodecyl acrylate (Alfa-Aesar) and potassium persulfate (Acros) are added into the first dispersion solution to perform surface polymerization on the surfaces of the white particles, which are corresponding to the first-type particles.

In addition, acrylate resin (CM 205, ChiMei), the charge controlling agent (Bontron N07, Orient) and carbon black (Nexon 600, Evonik) are added in a twin screw extruder (MPV 2015, APV) to make composite resin therewith, which is pulverized (LJ3, NPK) to obtain black particles with a particle size ($D_{50}$) about 3-8 μm and a charge density 15 μC/g (210HS-3, Trek). The black particles are then dispersed in water to form a second dispersion solution. Next, 2-carboxyethyl methacrylate (Sigma-Aldrich) and potassium persulfate (Acros) are added into the second dispersion solution to perform surface polymerization on the surfaces of the black particles, which are corresponding to the second-type particles.

The white and black pigment particles are filled into the display cells. The particle-filled display cells are filled with, by ink jet printing, a solution formed of thionyl chloride and N,N-dimethylethylene diamine (Sigma-Aldrich), followed by the heating process to remove the remaining solution therein, thereby completing the formation and fill of the charged black and white particles of opposite polarities in the cells.

Example 9

Styrene resin (PG383, ChiMei), the charge control agent (Bontron E84, Orient) and $TiO_2$ powders (R102, DuPont) are added in a twin screw extruder (MPV 2015, APV) to make composite resin therewith, which is then pulverized (LJ3, NPK) to obtain white particles with a particle size ($D_{50}$) about 4-7 μm, and a charge density about –80 μC/g (210HS-3, Trek). The white particles are then dispersed in water to form a dispersion solution. Next, perfluorodecyl acrylate (Alfa-Aesar) and potassium persulfate (Acros) are added into the dispersion solution to perform surface polymerization on the surfaces of the white particles, which are corresponding to the first-type particles.

In addition, acrylate resin (CM 205, ChiMei), poly(acrylic acid) (Sigma-Aldrich) and carbon black (Nexon 600, Evonik) are added in a twin screw extruder (MPV 2015, APV) to make composite resin therewith, which is then pulverized (LJ3, NPK) to obtain black particles with a particle size ($D_{50}$) about 2-6 μm.

The white and black pigment particles are filled into the display cells. The particle-filled display cells are filled with, by ink jet printing, a solution formed of thionyl chloride and N,N-dimethylethylene diamine (Sigma-Aldrich), followed by the heating process to remove the remaining solution therein, thereby completing the formation and fill of the charged black and white particles of opposite polarities in the cells.

In brief, the present invention, among other things, recites a simplified but effective method of manufacturing a switchable PBD. According to the invention, through modifying the surface structures of different pigment particles of two contrast colors, the surfaces of the pigment particles of the first color that carry the high density charges are configured to have the non-wettability and chemical inertness, while the surfaces of the pigment particles of the second color that carry no charge or the low density charges are configured to have the wettability and functional groups with the reaction selectivity and rapid responses. After filling such pigment particles of the two contrast colors into the cells, the pigment particles carrying of the second color are charged to have charges of a high density by interacting with the charge controlling agent through the chemical reaction or physical adsorption in the cells. As such, the electrostatic attraction generated particle aggregation can be avoided during the particle filling process, which makes the pigment particles of the two contrast colors filled uniformly in the cells, thereby simplifying effectively the manufacturing processes, increasing the production yield and reducing the costs.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:
1. A method for manufacturing a switchable particle-based display having a plurality of cells spatially arranged in a matrix form, comprising:

filling a plurality of first-type particles and a plurality of second-type particles into each cell, wherein the plurality of first-type particles carries charges of a first charge polarity; and filling a solution into each cell, wherein the solution comprises a charge controlling agent having a second charge polarity opposite to the first charge polarity, and wherein the charge controlling agent has a substantially selective wettability, absorbability or adsorbability on the plurality of second-type particles, so that at least part of the plurality of second-type particles is charged to the second charge polarity in each cell.

2. The method of claim 1, wherein the plurality of first-type particles and the plurality of second-type particles are premixed and filled into each cell.

3. The method of claim 1, wherein the plurality of first-type particles and the plurality of second-type particles are filled sequentially into each cell.

4. The method of claim 1, wherein each cell comprises compartment, microcup, microgrid, or partition structure.

5. The method of claim 1, wherein the surfaces of the plurality of second-type particles comprise a functional group capable of interacting or reacting with the charge controlling agent.

6. The method of claim 2, wherein, prior to mixing, the plurality of second-type particles is substantially electrically neutral.

7. The method of claim 1, wherein the plurality of second-type particles carries charges of the first charge polarity and has a charge density that is substantially lower than that of the plurality of first-type particles.

8. The method of claim 1, wherein the plurality of second-type particles carries charges of the second charge polarity and has a charge density that is substantially lower than that of the plurality of first-type particles.

9. The method of claim 1, wherein the charge controlling agent comprises ionic molecules or ionic monomers.

10. The method of claim 1, wherein, subsequent to filling the solution, the plurality of second-type particles has a charge density that is substantially same as that of the plurality of first-type particles.

11. The method of claim 1, wherein the plurality of first-type particles and the plurality of second-type particles are of contrast colors.

12. The method of claim 1, wherein the filling the solution into each cell is performed with printing, coating, casting, deposition, impregnation, spraying, or a combination of them.

13. The method of claim 1, further comprising removing the solution remaining in each cell.

14. The method of claim 1, further comprising sealing each cell subsequent to filling the solution.

* * * * *